(12) United States Patent
Mercer

(10) Patent No.: US 12,092,435 B2
(45) Date of Patent: Sep. 17, 2024

(54) ACTIVE VEHICLE DEFENSE SYSTEM AND METHOD OF USING THE SAME

(71) Applicant: Michael C. Mercer, South Portland, ME (US)

(72) Inventor: Michael C. Mercer, South Portland, ME (US)

( * ) Notice: Subject to any disclaimer, the term of this patent is extended or adjusted under 35 U.S.C. 154(b) by 911 days.

(21) Appl. No.: 17/123,600

(22) Filed: Dec. 16, 2020

(65) Prior Publication Data
US 2022/0187047 A1 Jun. 16, 2022

(51) Int. Cl.
| | | |
|---|---|---|
| *F41H 9/00* | (2006.01) |
| *B60R 11/00* | (2006.01) |
| *B60R 25/00* | (2013.01) |

(52) U.S. Cl.
CPC .............. *F41H 9/00* (2013.01); *B60R 11/00* (2013.01); *B60R 25/00* (2013.01); *B60R 2011/004* (2013.01); *B60R 2011/0057* (2013.01)

(58) Field of Classification Search
CPC . F41H 9/00; B60R 11/00; B60R 25/00; B60R 2011/004; B60R 2011/0057
USPC ......... 239/273, 275, 289, 69, 172, 175, 302, 239/536, 548, 550, 551, 565, 562
See application file for complete search history.

(56) References Cited

U.S. PATENT DOCUMENTS

| | | | |
|---|---|---|---|
| 5,318,147 A * | 6/1994 | Maiefski ................. | B60R 21/12 180/287 |
| 5,398,016 A | 3/1995 | Burayez | |
| 5,493,268 A * | 2/1996 | Lewis, Sr. ............... | B60R 25/10 180/287 |
| 5,598,142 A | 1/1997 | Winner, Jr. | |
| 5,677,668 A | 10/1997 | Winner, Jr. | |
| 5,703,563 A * | 12/1997 | Abe, Jr. .................. | B60R 25/00 180/287 |
| 6,334,490 B1 * | 1/2002 | Dille ........................ | A62C 3/07 239/302 |
| 8,186,366 B2 * | 5/2012 | Montoya ................. | B05B 15/62 239/289 |
| 8,754,787 B2 | 6/2014 | Furus | |
| 10,507,793 B1 * | 12/2019 | De Moura Partika ...................... | G08B 13/19613 |
| 2017/0108313 A1 | 4/2017 | Chang | |

(Continued)

FOREIGN PATENT DOCUMENTS

DE 1505259 A1 7/1969

OTHER PUBLICATIONS

Blaster (flamethrower); https://en.wikipedia.org/w/index.php?title=Blaster_(flamethrower)&oldid=922388353.

(Continued)

*Primary Examiner* — Steven J Ganey
(74) *Attorney, Agent, or Firm* — Michael J. Gallegher; Luper, Neidenthal & Logan

(57) ABSTRACT

An active vehicle defense system is presented, in which a chemical agent, repellant to humans and/or animals, is stored in the system, and directed to a housing on the exterior of a vehicle by an inlet channel. Within the housing, the inlet channel subdivides into a plurality of lateral channels, each terminating in an orifice, or spray point. A controller allows flows of the chemical agent to be turned on, off, and varied, as well as for relative differentials in flow volume and spray patterns as dispensed by the device, including allowing a 360-degree pattern of defensive spray to be established around a vehicle.

20 Claims, 5 Drawing Sheets

(56) References Cited

U.S. PATENT DOCUMENTS

2020/0283223 A1  9/2020  Herr

OTHER PUBLICATIONS

Pepper spray invention takes aim at carjackers; https://www.bizjournals.com/buffalo/stories/1998/06/29/focus2.html.

* cited by examiner

ACTIVE VEHICLE DEFENSE SYSTEM AND METHOD OF USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to the field of active vehicle defense systems, particularly to pepper-spray or other gas-emitting vehicle defense systems.

BACKGROUND OF THE INVENTION

Vehicle defense systems are often thought of primarily from a military perspective, as seen in the heavily armored vehicles that have recently been employed in various conflicts, and in particular in defense against improvised explosive devices (IED's). On the civilian side, most vehicle defense systems are passive in nature, consisting of steering column locks, alarm systems, biometric starting systems, and the like, all of which are primarily designed to protect a vehicle from theft or vandalism.

However, recent episodes of urban civil unrest have highlighted that the general population may be at risk of encountering violent demonstrations or criminal activity while in their automobiles (or other vehicles) and may have a need for escape in and with their vehicles. As a practical matter such an active defense system must be reasonably priced, relatively simple to use, effective, and within the cosmetic limitations of automotive design. Additionally, while there is need for effectiveness, civilian use as a self-defense measure is subject to legal limits, and must not, intentionally, or not, render disproportionate use of force against an attacker.

The Blaster (also called the "BMW Flamethrower") was a 1998 invention by a South African inventor designed to provide a defense against carjacking. The invention came in response to the increasingly severe violent crime situation in South Africa, which in 1998 had already made the country (particularly Johannesburg) the per capita murder, assault, rape, and carjacking capital of the world.

The Blaster was a liquefied petroleum gas flamethrower installed along the sides of the vehicle under the doors. Should a group of carjackers suddenly attack the vehicle while it is stopped in traffic (the typical scenario), the occupant could flip a switch and direct 5 meter plumes of flame upward into the facial area of anyone trying to enter the vehicle through the doors or windows. The device suffered from many drawbacks, not the least of which was the obvious potential for fatal injury. The device was also expensive and posed a risk to the vehicle occupants as well as possible assailants, and it was feared that the lethality of the device might lead potential carjackers to kill a driver preventively.

Sometimes vehicle defense systems are not aimed at protecting the entire vehicle, but are directed to protected vehicle accessories, such as expensive sound systems. U.S. Pat. No. 5,677,668 includes a container containing a pressurized protective material such as mace or a pepper gas. The protective material is released in the vehicle and onto the unauthorized person in the form of a spray or mist when the latter attempts to physically remove the protected accessory. The spray container can be mechanically or electronically actuated in response to displacement of the accessory from its mounted location and, preferably, the actuating control is integrated with a vehicle anti-theft security system or suitable condition detectors so that a sequence or combination of unauthorized entry events or conditions must occur before the container is placed in an operable mode. However, this system obviously does nothing to protect the vehicle, and any potential occupants, and is really only practical for an unattended vehicle. A similar device is seen in U.S. Pat. No. 5,598,142.

German patent DE 1 505 259 is a system designed to deter robberies or attacks on taxi drivers, by allowing a driver to release a noxious chemical, or other substance such as an identifying spray, into the passenger area and away from the driver. This does deal with a potentially incapacitating spray related to a vehicle, but once again, inside the vehicle, and not in defense of the vehicle itself.

A self-identified "Vehicle Defense System" is found in U.S. Pat. No. 5,398,016, that is more generally directed to a vehicle as a whole. This invention is a Vehicle Defense System (VDS) which, once triggered, generates enough smoke to completely engulf the interior of the protected property, e.g. a vehicle. This smoke attracts attention to the vehicle and visually impairs would be thieves from seeing valuables inside the vehicle. VDS can be used as an add-on to existing alarms or as a stand-alone defense system. The smoke generated is harmless to humans and the interior of the vehicle. VDS is a unique, effective defense or security system which protects silently. When used alone, it eliminates annoying false alarms. Again, such a system would have no utility for an occupied vehicle.

A more generally offensive system, and one designed for military or law enforcement purposes, is found in U.S. Pat. Appl. 2020/0283223. For military and law enforcement personal, an armed suspect may barricade themselves within a structure. The structure may be, for example, a vehicle, a building, or a house. Military and law enforcement personal may be required to use a chemical agent to force the armed suspect to leave the barricaded structure and/or surrender. However, this requires individually inserting gas canisters that produce the chemical agent into the barricaded structure. This can require a large number of gas canisters to produce enough chemical agent to force the suspect to leave the barricaded structure and/or surrender.

A similar military-type application is seen is U.S. Pat. Appl. 2017/0108313, for an offensive gas delivery device. Specifically, the embodiments of the gas delivery device allow an operator to release one or more chemical agents efficiently and safely into a barricaded structure. In an embodiment, the gas delivery device is attached to a vehicle such that an operator may forcefully insert the gas delivery device into a structure from a safe area (e.g., a remote area, inside an armored vehicle, etc.).

Embodiments of this invention include a housing including at least two or more chemical agent canisters, allowing an operator to safely insert the housing into a structure. The embodiments also allow an operator to remotely release chemical agent from the two or more gas canisters into the structure. This allows the operator to release a chemical agent within the structure without being exposed to an armed suspect. For example, the operator may remotely release the chemical agent from within an armored truck. The invention allows an operator to utilize a continuum of escalating force as a response to the barricaded suspect while the operator is in a safe position. However, as with the previous invention, it does not defend the vehicle, or its occupants.

A marine security system for deterring ship piracy is described in U.S. Pat. No. 8,754,787. It is a very large and complex system, well beyond what would be practical for a civilian passenger vehicle, and which would be unlikely to be feasible within the cosmetic design requirements of the automotive industry. A pepper-spray based vehicle system was described in general terms in a newspaper the 1990's, but its exact structure is unclear.

Thus, the art has sought vehicle defense systems that are simple, inexpensive, dependable, and which are not necessarily life-threatening. In part, the development of an optimal vehicle defense system rests in large part in the careful selection of the best deployable chemical agent.

Pepper spray, also known as oleoresin capsicum spray, OC spray, capsaicin spray, or capsicum spray, is a lachrymatory agent (a compound that irritates the eyes to cause a burning sensation, pain, and temporary blindness) used in policing, riot control, crowd control, and self-defense, including defense against dogs, bears, and other dangerous wildlife. Its inflammatory effects cause the eyes to close, temporarily taking away vision. This temporary blindness allows officers to restrain subjects and permits people in danger to use pepper spray in self-defense for an opportunity to escape more easily. It also causes temporary discomfort and burning of the lungs which causes shortness of breath.

Pepper spray was engineered into a spray originally for defense against bears and other dangerous predators. Many claim the use of OC is prohibited by the Chemical Weapons Convention (CWC), but it is not a chemical weapon and is listed as a "Riot Control Agent" according to the CWC's definitions. It is also listed as "Purposes Not Prohibited Under this Convention" under 9(d) of the CWC agreement).

The active ingredient in pepper spray is capsaicin, which is derived from the fruit of plants in the genus *Capsicum*, including chili peppers. Extraction of oleoresin capsicum (OC) from peppers requires capsicum to be finely ground, from which capsaicin is then extracted using an organic solvent such as ethanol. The solvent is then evaporated, and the remaining waxlike resin is the oleoresin capsaicin. An emulsifier such as propylene glycol is used to suspend OC in water, and the suspension may then be pressurized to make an aerosol pepper spray.

Determining the strength of pepper sprays made by different manufacturers can be confusing and difficult. Statements a company makes about their product strength are not regulated. A method using the capsaicin and related capsaicinoids (CRC) content of the product is unreliable as well because there are six different types of capsaicinoids, causing different levels of irritation. Manufacturers typically do not state which particular type of capsaicinoids are used. Personal pepper sprays can range from a low of 0.18% to a high of 3%. Most law enforcement pepper sprays use between 1.3% and 2%. The federal government of the United States has determined that bear attack deterrent sprays must contain at least 1.0% and not more than 2% CRC. CRC does not measure the amount of OC within the formulation. Instead, CRC is the pain-producing component of the OC that produces the burning sensation.

Pepper spray is an inflammatory agent. It inflames the mucous membranes in the eyes, nose, throat, and lungs. It causes immediate closing of the eyes, difficulty breathing, runny nose, and coughing. The duration of its effects depends on the strength of the spray; the average full effect lasts from 20 to 90 minutes, but eye irritation and redness can last for up to 24 hours.

For individuals not previously exposed to OC effects, the general feeling after being sprayed can be best likened to being set "alight." The initial reaction, should the spray be directed at the face, is the involuntary closing of the eyes, an instant sensation of the restriction of the airways and the general feeling of sudden and intense, searing pain about the face, nose, and throat. This is due to irritation of mucous membranes. Many people experience fear and are disoriented due to sudden restriction of vision even though it is temporary. There is an associated shortness of breath, although studies performed with asthmatics have not produced any asthma attacks in those individuals, and monitoring is still needed for the individuals after exposure. Police are trained to repeatedly instruct targets to breathe normally if they complain of difficulty, as the shock of the exposure can generate considerable panic as opposed to actual physical symptoms.

While there is some dispute over the relative safety of pepper spray, studies have concluded that single exposure of the eye to OC is harmless, but repeated exposure can result in long-lasting changes in corneal sensitivity. Thus, pepper spray may be an ideal agent on which to base. The present invention, in numerous embodiments, answers many of these long-felt issues and needs.

SUMMARY OF THE INVENTION

The instant invention as disclosed in multiple embodiments, all meant by way of example only and not limitation, may include an active vehicle defense system, by which a directed spray of a repellant chemical agent, may be used to repel attacking humans or animals that threaten a vehicle. The system has the capacity to lay down a 360-degree protective spray around a vehicle, hopefully giving the occupants of said vehicle to attempt to escape, as well as to save their vehicle.

One skilled in the art would know multiple methods for building and utilizing the devices and procedures outlined in the present teaching.

BRIEF DESCRIPTION OF THE ILLUSTRATIONS

Without limiting the scope of the vehicle defense system as disclosed herein and referring now to the drawings and figures.

Figure 2:
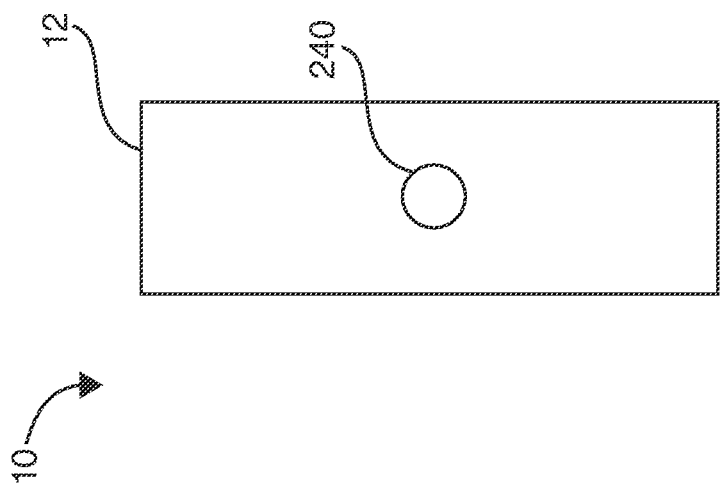
FIG. 2 shows a side elevation view of the embodiment of FIG. 1.
Figure 1:
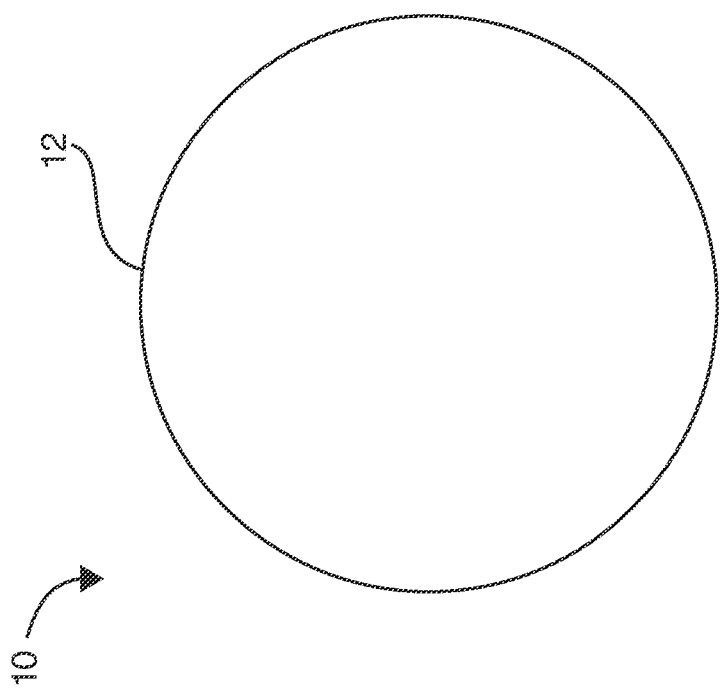
FIG. 1 shows a top plan view of an embodiment of the instant invention.

These illustrations are provided to assist in the understanding of the exemplary embodiments of a vehicle defense system, and a method for utilizing the same, as described in more detail below, and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

What is claimed then and seen well in FIGS. 1-7, is a vehicle defense system (10), that include a housing (102), having an inlet channel (100) that is in interruptible fluid communication with a chemical agent and with a plurality of lateral channels (200). Each lateral channel (200) may terminate to an ambient atmosphere at a lateral channel distal orifice (240).

Figure 7:
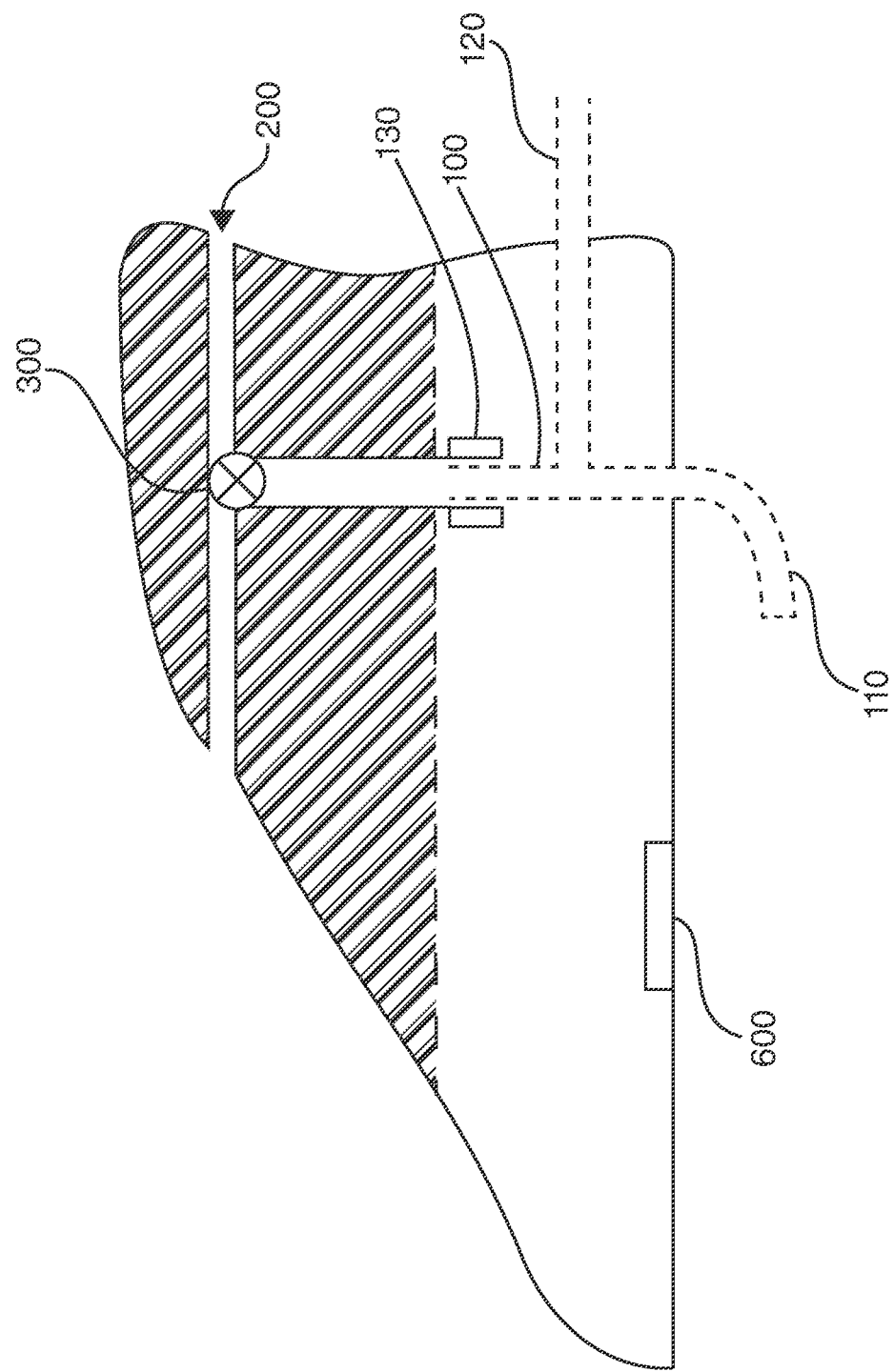
FIG. 7 shows a vertical section view taken along line 7-7 of FIG. 5.

One skilled the art will realize that the inlet channel (100) may, if supplied from an external source as will be discussed below, enter the housing (12) at nearly any point, often on the inferior or side surface of the housing (12), as seen in FIG. 7. A side entrance may be preferable in some embodiments, as it would allow the system to be easily removed from a vehicle, as it would not require any holes in the roof of such a vehicle. In the case of an internal storage means (410), discussed below, the inlet channel (100) may not need to penetrate the housing (12) at all.

While the particular embodiments disclosed relate to a vehicle defense system, it is noted that the same design and operational features could be incorporated into a stationary defense system for buildings, or the like, or for marine use, and therefore the description of a "vehicle" in the preamble is not meant to be limiting.

For the purposes of this specification, "chemical agent" is intended to have the widest possible interpretation, and includes any agent that can be liquified, fluidized, powdered, or aerosolized sufficient to have a fluid-like flow through the device. It can include any chemical substance, natural or human-made, that may be useful in repelling human or animal aggressors against the vehicle. In many embodiments, a non-lethal chemical agent is preferable, but there is no absolute limit to the physiologic effects produced by such a chemical agent. In one preferred embodiment, the chemical agent may be a pepper spray, many varieties of which, by way of example only and not limitation, are discussed above.

Figure 4:
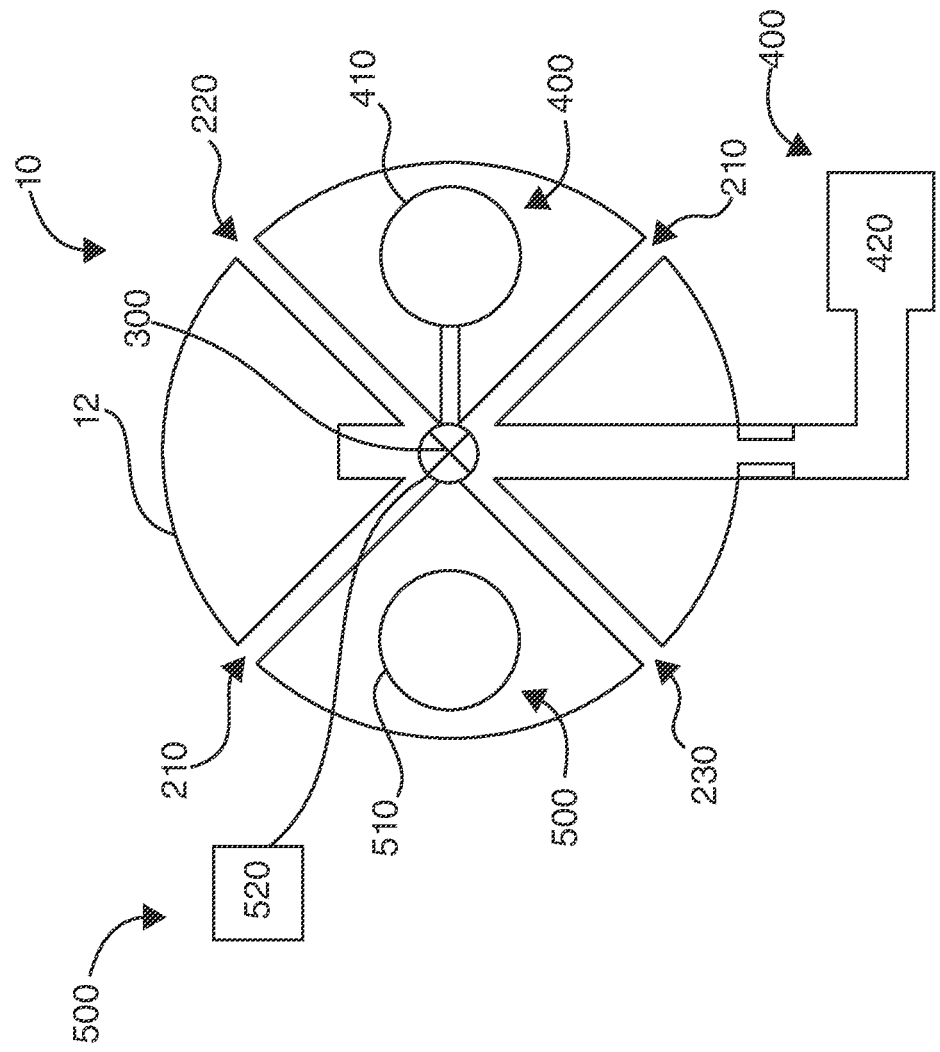
FIG. 4 shows a top section view taken along line 4-4 of FIG. 3.
Figure 3:
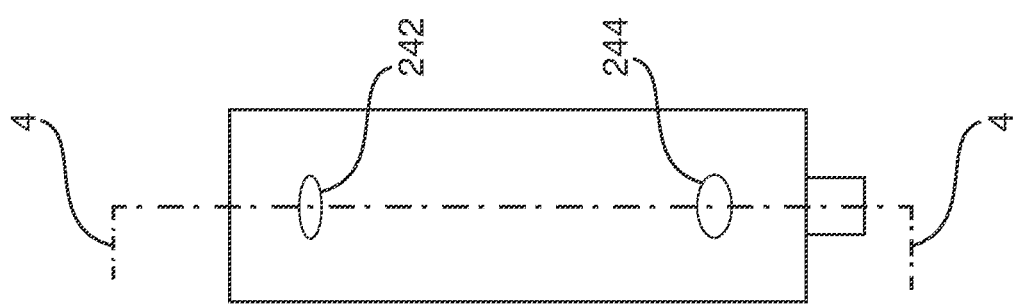
FIG. 3 shows another side elevation view of the embodiment of FIG.1.
Figure 5:
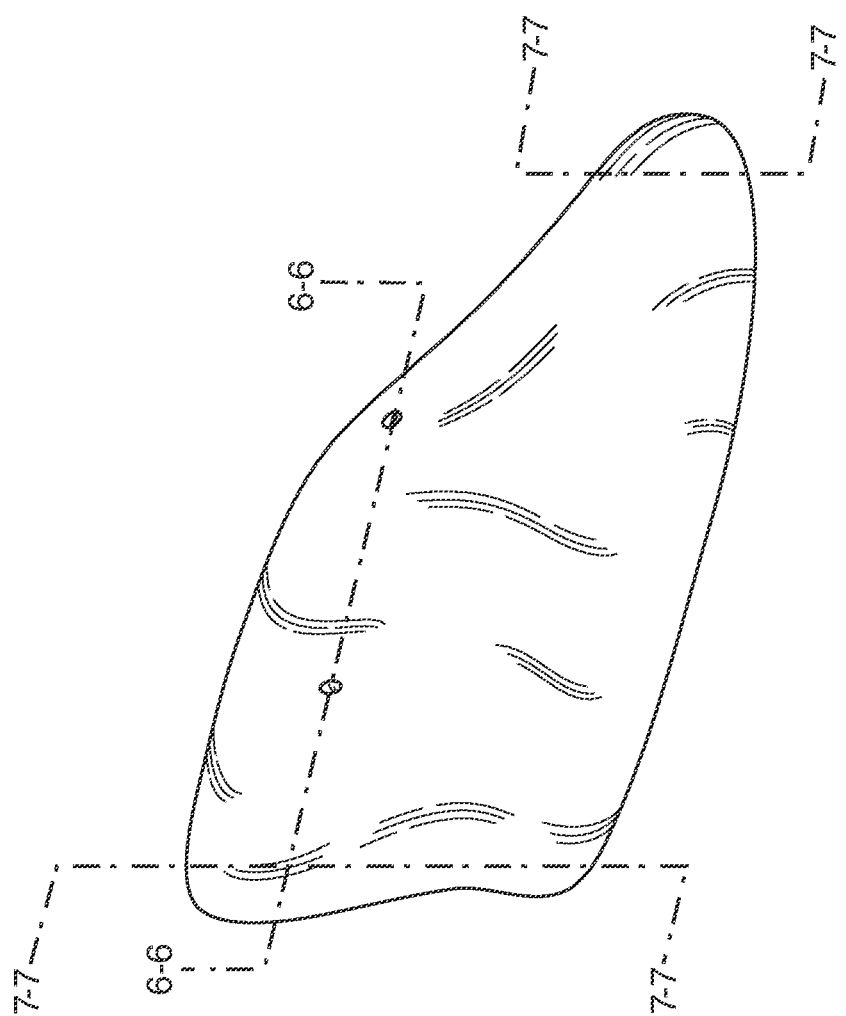
FIG. 5 shows an elevated perspective view of another embodiment of the instant invention.
Figure 6:
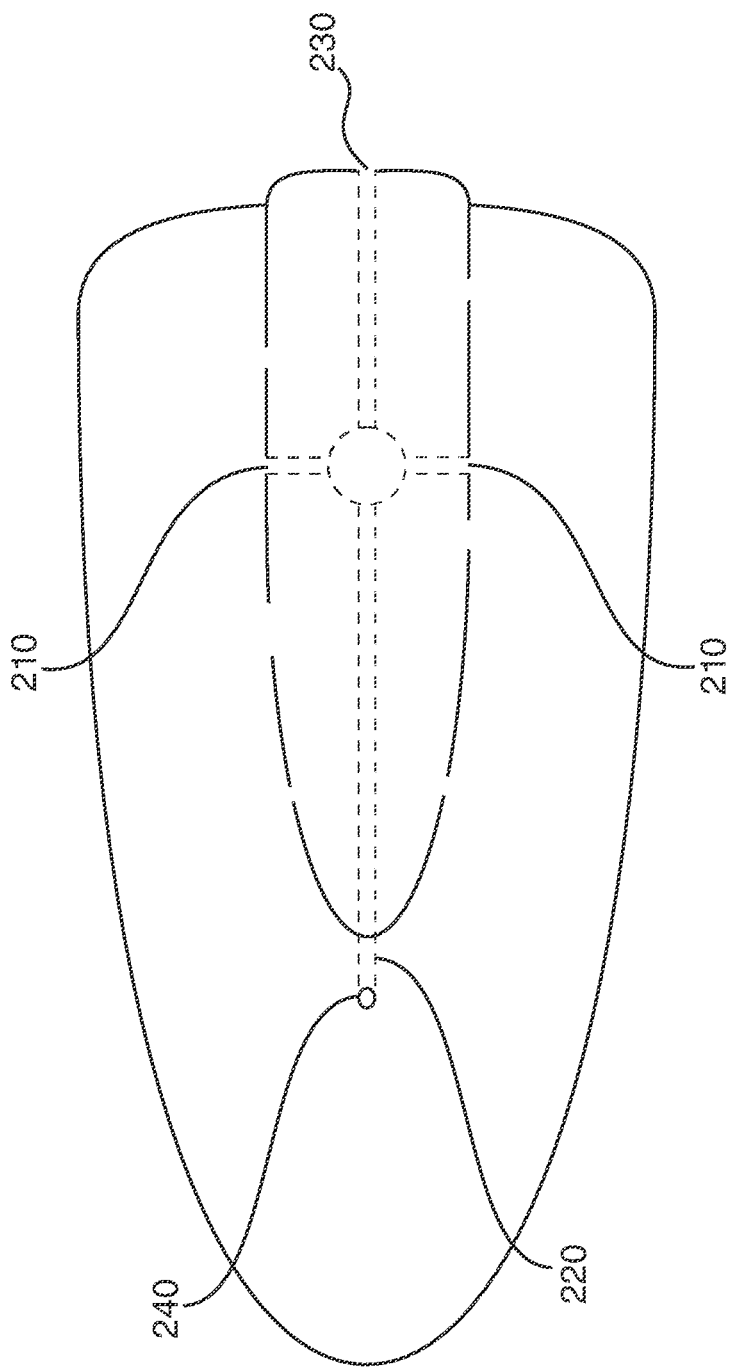
FIG. 6 shows a top section view taken along line 6-6 of FIG. 5.

The system also has a storage means (400), seen schematically in FIG. 4, enclosing the chemical agent that is in fluid communication with the inlet channel (100), as well as a controller means (500), also seen schematically in FIG. 4, that regulates a fluid flow through the various channels and orifices, either passively, automatically or under the direct control of an operator. The system also has a vehicle mounting means (600), seen well in FIG. 7, for attaching the housing (12) to a vehicle, and this may be permanent or removable installation. In one preferred embodiment, the vehicle mounting means (600) is a magnetic mounting means.

The number of lateral channels would depend in part on the spray characteristics of the intended chemical agent, as well as any intended spray pattern thereof. In some embodiments, a 360-degree coverage pattern around the periphery of the vehicle may be desired. In other embodiments, it may be desired to have less than a 360-degree coverage pattern. In one embodiment, the plurality of lateral channels (200) may include at least three lateral channels (200). If such channels, and the orifices connected to them, were spaced approximately 120 degrees apart, a 360-degree coverage pattern could be achieved. In a preferred embodiment, four lateral channels (200), which could include two lateral side channels (210), one lateral forward channel (220) and one lateral rearward channel (230), all spaced approximately 90 degrees apart, would have a similar result.

Depending on volumetric requirements, which in turn would depend on the nature of the chemical agent used, and as seen schematically in FIG. 4, the storage means (400) further may include an internal storage means (410) at least partially within the housing (12), that has at least one wall and enclosing an inner storage volume of the chemical agent. However, in other embodiments, it may be desired that the volume of the storage means (400) be greater than what can be accommodated within a reasonably sized housing (12), or which, for some other reason, is desired to be made apart from said housing (12). In such embodiments, the storage means (400) can be an external storage means (420) not at least partially within the housing (12) having at least one wall and enclosing an external storage volume of the chemical agent. By way of example only and not limitation, an external storage means (400) may be placed within the inside of a vehicle, and a flexible, semi-rigid, or rigid inlet channel (100) may be run up to, and through the housing (12).

At some point, the inlet channel (100) must begin to transition or subdivide into lateral channels (200). One skilled in the art will realize, as may be visualized in FIGS. 4, 6 and 7, that the lateral channels (200) may not have the same length, or even the same diameter. It may be desired to have equal flow among all the plurality of lateral channels (200), or it may be desired to have preferential flow through one or more. Therefore, the housing (12) may include a diverter means (300) in fluid communication with the inlet channel (100) and at least one of the plurality of lateral channels (200) at a point of intersection of the inlet channel (100) and at least one of the lateral channels (200), whereby a fluid flow rate is regulated in at least one of the lateral channels (200).

In one embodiment, which may be envisioned well from FIG. 4, the diverter means (300) may have a fixed conformation and delivers a predetermined percentage of the fluid flow rate from the inlet channel (100) to at least one of the plurality of lateral channels (200). This would be the case where the inlet channel (100) might terminate in a common meeting with the lateral channels (200) and be designed so as to direct approximately the same flow through each of the lateral channels (200) that so meet. In such a case, the diverter means (300) further comprises at least a portion of a wall of at least one of the plurality of lateral channels (200), as for example where the diverter means (300) is envisioned as the mixing point, as seen in FIG. 4, where the inlet channel (100) splits into four lateral channels (200), by way of example and not limitation.

In other embodiments, the diverter means (300) may be active, and comprise, again by way of example only, one or more valves that could preferentially divert flow into one or more of the lateral channels. This would be a more active system, and in some embodiments, the system (10) may include an internal controller means (510) at least partially within the housing (12) and controlling the fluid flow rate of the chemical agent through the diverter means (300). Such internal controller means (510) embodiments may have the advantage of being Bluetooth or other radio-electronic control, which may avoid the necessity for external wired controls. But in other embodiments, the system (10) may include an external controller means (520) not at least partially within the housing (12), for controlling the fluid flow rate of the chemical agent through the diverter means (300). In its simplest arrangement, such a system can be a wired connection to the internal compartment of the vehicle, allow a system (10) operator to control flows.

Thus, the controller means (500) may incorporate a central processing unit and can turn the entire system (10) on or off, as well as direct preferential flows through one or more of the lateral channels (200). In one embodiment, the controller means (500) can regulate a differential fluid flow rate of the chemical agent within at least two of the plurality of lateral channels (200).

The controller means (500) may also have control functions over the lateral channel distal orifices (240), found at the termination of each lateral channel with the ambient atmosphere. At least one of the lateral channel orifices (240) may be individually controllable by the controller means (500) to vary at least one lateral channel orifice area (242). One skilled in the art would realize that varying the orifice area would tend to vary the distance a spray would travel. Similarly, at least one of the lateral channel orifices (240) may be individually controllable by the controller means (500) to vary at least one lateral channel orifice shape (244). By way of example and not limitation, it can be seen in FIG. 3 that the lateral channel orifice (242) is slightly smaller and has a slightly different shape that lateral channel orifice (244). As can be seen from FIG. Again, one skilled in the art would realize that varying a lateral channel orifice shape would tend to affect a spray pattern.

The housing (12) may have a varying external appearance and be attached to the vehicle in many ways. In the accompanying drawings, two main cosmetic designs are envisioned. The first, seen in FIGS. 1-4, has been termed the "hockey puck" embodiment. Another, seen well in FIGS. 5-7, has been termed the "shark fin" embodiment. Either of the embodiments may contain all the features discussed in this specification. The "shark fin" embodiment may have some cosmetic advantage, as it tends to resemble the same design as the electronic antenna devices found atop many contemporary vehicles.

The system (10) may be permanently affixed to the vehicle or may be removable. In one embodiment, a vehicle mounting means (600) is a magnetic mounting means. For those systems being both removable and having an external storage means (400) and/or an external controller means (520), it may be advantageous to have a quick release connector (130), as seen in FIG. 7, interposed at some point between the inlet channel (100) and the external storage means (400) and/or controller means (500).

In one particular embodiment, and as seen in FIGS. 4 and 7, a vehicle defense system can have a housing (102) having an inlet channel (100) in interruptible fluid communication with a chemical agent, which in turn is in fluid communication with four lateral channels (200). These lateral channels (200) can include two lateral side channels (210), one lateral forward channel (220) and one lateral rearward channel (230), wherein each lateral channel (200) terminates to an ambient atmosphere at a lateral channel distal orifice (240).

There may be an external storage means (420) not at least partially within the housing (12) having at least one wall and enclosing an external storage volume comprising the chemical agent, in interruptible fluid communication with the inlet channel (100). As discussed above, this external storage means (420) may be placed in the interior of the vehicle. The can be an external controller means (520) not at least partially within the housing (12) controlling a flow of the chemical agent through the inlet channel (100), and again, this external controller means (520) may also be placed in the interior of the vehicle.

The housing (12) is attached to the vehicle by a vehicle mounting means (600), which could be placed anywhere on the exterior surface of the vehicle, although for many applications, somewhere on the roof of the vehicle may be the most practical.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the method and products are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A vehicle defense system (10), comprising:
   a housing (12), having an inlet channel (100) in interruptible fluid communication with a chemical agent and with a plurality of lateral channels (200), wherein each lateral channel (200) terminates to an ambient atmosphere at a lateral channel distal orifice (240),
   a storage means (400) enclosing the chemical agent in fluid communication with the inlet channel (100),
   a controller means (500), and
   a vehicle mounting means (600).

2. The device according to claim 1, wherein the chemical agent is a pepper spray.

3. The device according to claim 1, wherein the plurality of lateral channels (200) comprises at least three lateral channels (200).

4. The device according to claim 1, wherein the plurality of lateral channels (200) consists of four lateral channels (200) including two lateral side channels (210), one lateral forward channel (220) and one lateral rearward channel (230).

5. The device according to claim 1, wherein the storage means (400) further comprises an internal storage means (410) at least partially within the housing (12), having at least one wall and enclosing an inner storage volume of the chemical agent.

6. The device according to claim 1, wherein the storage means (400) further comprises an external storage means (420) not at least partially within the housing (12), having at least one wall and enclosing an external storage volume of the chemical agent.

7. The device according to claim 1, wherein the housing (12) further comprises a diverter means (300) in fluid communication with the inlet channel (100) and at least one of the plurality of lateral channels (200) at a point of intersection of the inlet channel (100) and at least one of the lateral channels (200), whereby a fluid flow rate is regulated in at least one of the lateral channels (200).

8. The device according to claim 7, wherein the diverter means (300) has a fixed conformation and delivers a predetermined percentage of the fluid flow rate from the inlet channel (100) to at least one of the plurality of lateral channels (200).

9. The device according to claim 7, wherein the diverter means (300) further comprises at least a portion of a wall of at least one of the plurality of lateral channels (200).

10. The device according to claim 7, wherein the controller means (500) further comprises an internal controller means (510) at least partially within the housing (12) and controlling the fluid flow rate of the chemical agent through the diverter means (300).

11. The device according to claim 7, wherein the controller means (500) further comprises an external controller means (520) not at least partially within the housing (12) and controlling the fluid flow rate of the chemical agent through the diverter means (300).

12. The device according to claim 7, wherein the diverter means (300) is at least one valve.

13. The device according to claim 1, wherein the controller means (500) regulates a differential fluid flow rate of the chemical agent within at least two of the plurality of lateral channels (200).

14. The device according to claim 1, wherein at least one of the lateral channel orifices (240) is individually controllable by the controller means (500) to vary at least one lateral channel orifice area (242).

15. The device according to claim 1, wherein at least one of the lateral channel orifices (240) is individually controllable by the controller means (500) to vary at least one lateral channel orifice shape (244).

16. The device according to claim 14, wherein a variation in the at least one lateral channel orifice shape (244) produces a variation in a spray pattern of the chemical agent.

17. The device according to claim 1, wherein the vehicle mounting means (600) is a magnetic mounting means.

18. A vehicle defense system, comprising:
a housing (102) having an inlet channel (100) in interruptible fluid communication with a chemical agent, in fluid communication with four lateral channels (200) including two lateral side channels (210), one lateral forward channel (220) and one lateral rearward channel (230), wherein each lateral channel (200) terminates to an ambient atmosphere at a lateral channel distal orifice (240),
an external storage means (420) not at least partially within the housing (12) having at least one wall and enclosing an external storage volume comprising the chemical agent, in interruptible fluid communication with the inlet channel (100),
an external controller means (520) not at least partially within the housing (12) controlling a flow of the chemical agent through the inlet channel (100), and
a vehicle mounting means (600).

19. The device according to claim 18, inlet channel (100) further comprises an inlet channel selected from the group of inlet channels consisting of an inferior inlet channel (110) and a lateral inlet channel (120).

20. The device according to claim 18, wherein the inlet channel (100) further comprises a quick-release channel connector (130).

\* \* \* \* \*